(12) United States Patent
Qian et al.

(10) Patent No.: US 9,249,291 B2
(45) Date of Patent: Feb. 2, 2016

(54) THERMOPLASTIC ELASTOMERS WITH SILKY FEEL

(71) Applicant: PolyOne Corporation, Avon Lake, OH (US)

(72) Inventors: Guoqiang Qian, Buffalo Grove, IL (US); Krishna Venkataswamy, Crystal Lake, IL (US); Malar Shetty, Crystal Lake, IL (US)

(73) Assignee: PolyOne Corporation, Avon Lake, OH (US)

( * ) Notice: Subject to any disclaimer, the term of this patent is extended or adjusted under 35 U.S.C. 154(b) by 0 days.

(21) Appl. No.: 13/794,134

(22) Filed: Mar. 11, 2013

(65) Prior Publication Data

US 2014/0011898 A1    Jan. 9, 2014

Related U.S. Application Data

(60) Provisional application No. 61/668,591, filed on Jul. 6, 2012.

(51) Int. Cl.
| | | |
|---|---|---|
| *C08L 51/00* | (2006.01) | |
| *C08L 53/00* | (2006.01) | |
| *C08L 75/04* | (2006.01) | |
| *C08L 83/04* | (2006.01) | |
| *C08L 23/06* | (2006.01) | |

(52) U.S. Cl.
CPC ............... *C08L 51/003* (2013.01); *C08L 23/06* (2013.01); *C08L 53/00* (2013.01); *C08L 75/04* (2013.01); *C08L 83/04* (2013.01); *C08L 2205/03* (2013.01); *C08L 2205/08* (2013.01)

(58) Field of Classification Search
CPC ..... C08L 53/00; C08L 75/04; C08L 2205/03; C08L 2205/08

USPC .......................................................... 525/77
See application file for complete search history.

(56) References Cited

U.S. PATENT DOCUMENTS

| | | | |
|---|---|---|---|
| 6,133,354 A | 10/2000 | Wang et al. | |
| 6,153,691 A | 11/2000 | Gornowicz et al. | |
| 7,671,130 B2 * | 3/2010 | Crafton et al. | ................. 525/88 |
| 7,923,119 B2 * | 4/2011 | Suzuki et al. | ................. 428/500 |
| 2003/0083434 A1* | 5/2003 | Ouhadi et al. | ................. 525/80 |
| 2004/0070653 A1* | 4/2004 | Mashita et al. | ................. 347/86 |
| 2004/0164456 A1 | 8/2004 | McGlothlin et al. | |
| 2005/0228157 A1 | 10/2005 | Peterson et al. | |
| 2006/0052535 A1 | 3/2006 | Ajbani et al. | |
| 2007/0000926 A1 | 1/2007 | Jacob et al. | |
| 2010/0160545 A1 | 6/2010 | Page | |
| 2011/0059277 A1 | 3/2011 | Kolb et al. | |

FOREIGN PATENT DOCUMENTS

| | | | |
|---|---|---|---|
| JP | 08053615 A | * | 2/1996 |
| WO | WO-2010091232 A2 | * | 8/2010 |

OTHER PUBLICATIONS

Multibase Group, "Siloxane masterbatch Range", May 2010.*
English-language abstract and machine translation of JP-08053615-A obtained from the Japan Patent Office on Mar. 17, 2015.*
Dow Corning Product Information, Dow Corning MB50-002 Masterbatch, 2001.

* cited by examiner

*Primary Examiner* — Melissa Rioja
(74) *Attorney, Agent, or Firm* — Michael J. Sambrook; John H. Hornickel

(57) ABSTRACT

A thermoplastic elastomer compound is blended from styrenic block copolymer, thermoplastic vulcanizate, thermoplastic polyurethane, a compatibilizer, and a masterbatch containing silicone, which is added to provide a qualitative silky feel on surfaces of plastic articles made from the compound.

16 Claims, No Drawings

THERMOPLASTIC ELASTOMERS WITH SILKY FEEL

CLAIM OF PRIORITY

This application claims priority from U.S. Provisional Patent Application Ser. No. 61/668,591 filed on Jul. 6, 2012, which is incorporated by reference.

FIELD OF THE INVENTION

This invention relates to thermoplastic elastomers, polymer compounds which exhibit elasticity while remaining thermoplastic, which have a silky feel.

BACKGROUND OF THE INVENTION

The world of polymers has progressed rapidly to transform material science from wood and metals of the $19^{th}$ Century to the use of thermoset polymers of the mid-$20^{th}$ Century to the use of thermoplastic polymers of later $20^{th}$ Century.

Thermoplastic elastomers (TPEs) combine the benefits of elastomeric properties of thermoset polymers, such as vulcanized rubber, with the processing properties of thermoplastic polymers.

Thermoplastic elastomers can include styrene block copolymers (SBCs), thermoplastic vulcanizates (TPV), thermoplastic olefins (TPO), copolyesters (COPE), thermoplastic urethanes (TPU), copolyamide (COPA), and most recently olefin block copolymers (OBCs).

SUMMARY OF THE INVENTION

Any plastic article needing flexibility, elongation, and tensile strength properties can benefit from the use of a TPE. For example, handheld electronics on the market for consumer use, such as cell phones, tablet computers, electronic readers, etc. often include a cover as an accessory because consumers desire to protect such expensive, frequently used devices. Currently, consumers prefer the cover materials to be strong, have a silky feeling, and be non-tacky, stain resistant, and elastic.

Moreover, molders of such electronic device covers desire for the compound to have good moldability (especially, thin wall moldability), good bonding to polar substrates such as ABS, polycarbonate, etc, and good ability to be made in a variety of colors, called colorability.

Currently the material of choice for covers for handheld electronics is a special silicone-based TPV (TPSiV). TPSiV has a good silky feel, but its manufacturability and colorability are not as good as the traditional TPEs or TPVs. During manufacturing, TIPSiV tends to flash easily and requires very tight shutoffs and venting during processing. This inferior processability can lead to a plastic article with a lower tensile strength compared to what is needed for a cover for handheld electronics.

What the art needs is a better processing TPE which also has a silky feel when molded into plastic articles such as covers for handheld electronic devices.

The TPE compounds of this invention have a silky feel but also have good tensile strength, non-tacky condition, elasticity, and thin wall moldability. These compounds are blends of SBC, TPV, and TPU with a limited amount of a silicone masterbatch.

One aspect of the invention is a thermoplastic elastomer compound, comprising (a) styrenic block copolymer; (b) thermoplastic vulcanizate; (c) thermoplastic polyurethane; (d) compatibilizer to assist in blending of the styrenic block copolymer with the thermoplastic polyurethane; and (e) silicone in an amount of less than about 1.0 weight percent of the compound.

One advantage of the TPE compounds of the invention is the ability to process well, benefiting the molder of the final plastic article, and the ability to impart a silky feel to the final plastic article, benefiting the consumer user.

Non-limiting embodiments are described below.

EMBODIMENTS OF THE INVENTION

Styrenic Block Copolymer Resin

Any commercial styrene block copolymer (SBC) fundamentally is a candidate for use in this invention. Preferably, a highly hydrogenated SBC is used. Non-limiting examples of highly hydrogenated SBCs include styrene-ethylene butylene-styrene polymers, styrene-ethylene propylene-styrene polymers, hydrogenated styrene-isoprene block copolymers, and hydrogenated styrene-butadiene block copolymers, and combinations of them.

The preferred thermoplastic elastomer is a styrenic block copolymer, more preferably one which is hydrogenated such as styrene-ethylene-butylene-styrene (SEBS) or styrene-ethylene-ethylene-propylene-styrene (SEEPS) in a variety of grades.

SEBS and SEEPS should have a weight average molecular weight of between about 70,000 and about 360,000 with a preferred molecular weight of about 100,000-300,000. The ratio of styrenic end-block to olefinic mid-block should range from about 20/80 to about 40/60, and preferably about 30/70.

Hydrogenated styrene block copolymers are commercially available from a number of sources, preferably the Kraton A brand series from Kraton Polymers, which have good compatibility with thermoplastic polyurethanes. Of the various A grades, Kraton A1535 is desirable. Also Septon 4055 SEEPS can be used.

TPV Resin

For the thermoplastic vulcanizate, one can use a pre-mixed blend of a continuous phase of a polyolefin such as polypropylene and a discontinuous phase of a vulcanized rubber such as crosslinked ethylene-propylene-diene rubber (EPDM). These blends are commercially available as thermoplastic vulcanizate (TPV) concentrates from ExxonMobil Corporation in a number of grades marketed under the Santoprene™ brand, particularly the Santoprene™ 8000 series grades. It was reported by the manufacturer that Santoprene™ 8000 series grades have a halogen content of less than 200 parts per million. Of the Santoprene™ 8000 grades, Santoprene™ RC8001 TPV concentrate is presently preferred. Using Santoprene™ RC8001 TPV concentrate has the advantage that, as a ready-vulcanized concentrate, there is no risk of the other ingredients interfering with the vulcanization system, or of vulcanization chemicals adversely interacting with the other ingredients in the thermoplastic compound.

TPU Resin

TPU is a desirable thermoplastic elastomer as it exhibits high tensile and tear strength, high flexibility at low temperatures, and extremely good abrasion and scratch resistance. TPU is also relatively stable against oil, fats and many solvents, as well as ultraviolet radiation. Because of these desirable features, TPU can be beneficially used for a number of end use applications, such as those in automotive and the footwear industries.

For simplicity, the term "polyurethane" as used herein includes polymers containing urethane (also known as carbamate) linkages, urea linkages, or combinations thereof (i.e., in the case of poly(urethane-urea)s). Thus, thermoplastic polyurethanes of the invention contain at least urethane linkages and, optionally, urea linkages.

A wide variety of TPU chemistries are suitable for use as the base TPU in the invention. For example, a number of aliphatic and aromatic chemistries can be used. One or more TPU chemistries can be used to form the TPU for compounds of the invention.

The term "aromatic" refers to TPUs derived from mononuclear aromatic hydrocarbon groups or polynuclear aromatic hydrocarbon groups. The term includes those TPUs derived from arylene groups. The term "arylene group" means a divalent aromatic group.

The term "aliphatic" refers to TPUs derived from saturated or unsaturated, linear, branched, or cyclic hydrocarbon groups. This term is used to encompass those TPUs derived from alkylene (e.g., oxyalkylene), aralkylene, and cycloalkylene (e.g., oxycycloalkylene) groups, for example. The term "alkylene group" means a saturated, linear or branched, divalent hydrocarbon group. Particularly preferred alkylene groups are oxyalkylene groups. The term "oxyalkylene group" means a saturated, linear or branched, divalent hydrocarbon group with a terminal oxygen atom. The term "aralkylene group" means a saturated, linear or branched, divalent hydrocarbon group containing at least one aromatic group. The term "cycloalkylene group" means a saturated, linear or branched, divalent hydrocarbon group containing at least one cyclic group. The term "oxycycloalkylene group" means a saturated, linear or branched, divalent hydrocarbon group containing at least one cyclic group and a terminal oxygen atom.

The thermoplastic urethane (TPU) contributes strength and overmolding properties to the thermoplastic elastomer compound of the invention. Any thermoplastic polyurethane is a candidate for use in the present invention. Of commercially available TPUs, Elastollan™ brand TPUs are preferred from BASF, especially such grades as Elastollan 880A, Elastollan 1180A, and Elastollan S85A. These grades have good elastic properties as well as good tensile strength and abrasion resistance properties.

Silicone

Silicone, formally polydimethylsiloxane, is the material which imparts the silky feel to the TPE compounds of the invention.

Practically, silicone can be highly concentrated into a masterbatch with polyolefins or HIPS, POM, SAN, PA6, etc. as the thermoplastic carrier in order to facilitate good handling for melt-mixing to form the compound and for easy dispersion.

The amount of silicone in the masterbatch can range from about 20 to about 60 and preferably from about 45 to about 50%. Therefore, when computing the amount of silicone to be used in the present invention, one needs to take in to account the amount of silicone in the masterbatch and the amount of masterbatch in the compound.

Commercially available silicone masterbatches are MB50-001, MB50-002, MB50-004, MB50-006, MB50-006, MB50-008, MB50-010, MB50-011, MB50-017 etc. from Dow Corning and MB150, MB250, MB2450, etc from Polymer Dynamix. Of these choices, MB50-002 was used in the examples and contains 50% of an ultra-high molecular weight siloxane polymer dispersed in low-density polyethylene. Its manufacturer, Dow Corning, reports improved surface properties are expected at 2% to 10% addition levels. At 0.2% to 2% addition, only improved processing and flow of the resin was expected. Unexpectedly, the compounds of the present invention showed performance of silky feel at less than 2.3% addition level of MB50-002, which equates to less 1.15% siloxane content in the compound.

Compatibilizer

A compatibilizer can be used to assist in the compatible blending of the styrenic block copolymer with the TPU and other ingredients. Any compatibilizer with an affinity for both the styrenic block copolymer and the TPU is a candidate for use in the invention. A preferred compatibilizer is maleic anhydride grafted styrene-ethylene-butylene-styrene (also known as maleated SEBS) because that compatibilizer is believed to have good compatibility with both TPU and SEBS, thus keeping the overall formulation compatibilized. Commercially available maleic anhydride grafted SEBS are Kraton FG1901X, FG 1924, and MD6684 from Kraton Polymers. Other compatibilizers such as Septon TU-Polymer from Kuraray can be used.

Optional Plasticizer Oil

As stated above, depending on the type of hydrogenated styrenic block copolymer used, plasticizing oil may be necessary to improve flow and flexibility of the resulting TPE. Any oil conventionally used to plasticize a SBC is a candidate for use, such as mineral oil, vegetable oil, synthetic oil, etc. A presently preferred oil is Puretol 380 brand oil from Petro Canada of Toronto, Canada.

Optional Filler

To lower the cost in some embodiments of the TPE compounds, it has been found that adding an inorganic filler is desirable. Calcium carbonate ($CaCO_3$) is a suitable filler, although any inorganic filler having sufficient purity for use in contact with food can be a candidate for use in the invention.

Optional Additives

The compound of the present invention can include conventional plastics additives in an amount that is sufficient to obtain a desired processing or performance property for the compound. The amount should not be wasteful of the additive nor detrimental to the processing or performance of the compound. Those skilled in the art of thermoplastics compounding, without undue experimentation but with reference to such treatises as *Plastics Additives Database* (2004) from Plastics Design Library (www.elsevier.com), can select from many different types of additives for inclusion into the compounds of the present invention.

Non-limiting examples of optional additives include adhesion promoters; biocides (antibacterials, fungicides, and mildewcides), anti-fogging agents; anti-static agents; bonding, blowing and foaming agents; dispersants; fillers and extenders; fire and flame retardants and smoke suppressants; impact modifiers; initiators; lubricants; micas; pigments, colorants and dyes; oils and plasticizers; processing aids; release agents; silanes, titanates and zirconates; slip and anti-blocking agents; stabilizers; stearates; ultraviolet light absorbers; viscosity regulators; waxes; and combinations of them. Anti-oxidants are particularly useful for these plastic compounds to provide additional durability.

Table 1 shows acceptable, desirable, and preferable ranges of ingredients useful in the present invention, all expressed in weight percent (wt. %) of the entire compound. The compound can comprise, consist essentially of, or consist of these ingredients.

TABLE 1

|  | Acceptable | Desirable | Preferable |
|---|---|---|---|
| SBC Resin | 1-30 | 3-20 | 5-12 |
| Compatibilizer | 0.1-10 | 1-8 | 2.5-4 |
| TPV Resin | 0.1-15 | 2-10 | 3-6 |
| TPU Resin | 10-90 | 20-70 | 45-60 |
| Silicone Masterbatch with 50% silicone content | 0.2-2.0 | 0.4-1.6 | 0.5-1.5 |
| Optional Plasticizer Oil | 0-40 | 5-30 | 10-20 |
| Optional Filler | 0-30 | 5-25 | 10-12 |
| Optional Additives | 0-10 | 0.2-3 | 1-2 |

Processing

The preparation of compounds of the present invention is uncomplicated once the proper ingredients have been selected. The compound of the present can be made in batch or continuous operations.

Mixing in a continuous process typically occurs in an extruder that is elevated to a temperature that is sufficient to melt the polymer matrix with addition of all additives at the feed-throat, or by injection or side-feeders downstream. Extruder speeds can range from about 300 to about 700 revolutions per minute (rpm), and preferably from about 500 rpm. Typically, the output from the extruder is pelletized for later extrusion or molding into polymeric articles.

Subsequent extrusion or molding techniques are well known to those skilled in the art of thermoplastics polymer engineering. Without undue experimentation but with such references as "Extrusion, The Definitive Processing Guide and Handbook"; "Handbook of Molded Part Shrinkage and Warpage"; "Specialized Molding Techniques"; "Rotational Molding Technology"; and "Handbook of Mold, Tool and Die Repair Welding", all published by Plastics Design Library (www.elsevier.com), one can make articles of any conceivable shape and appearance using compounds of the present invention.

Usefulness of the Invention

Any plastic article needing flexibility, elongation, physical properties of a TPE, and also a silky feel surface can benefit from TPEs of the present invention. The plastic article can be formed from the compound by molding, extruding, or calendering. Non-limiting examples of plastic articles include protective covers for handheld consumer electronics items, such items as cell phones, tablet computers, electronic readers, etc. Also, it can be used in grip applications such as electronic consoles and controlling devices, gaming consoles, desk computers, laptop computers, etc. These applications need the silky feel for aesthetic reasons and to prevent the parts from slipping from hands.

The TPE compounds of this invention have a silky feel but also have good tensile strength, non-tacky condition, elasticity, and thin wall moldability. The compounds do not flash and thus can use deeper vents than the TIPSiV, which means less material degradation and a broader processing window.

The compounds also have good colorability and a good overmolding bonding strength to polycarbonate. The larger process window for the TPE compounds compared with TPSiV results in a higher tensile strength, which prevents the consumer cover from tearing when pulled by the consumer during usage. Therefore the TPE compounds can be effectively used in electronic covers and other similar consumer applications.

Examples further explain the invention.

EXAMPLES

Comparative Examples A-C and Examples 1-3

Table 2 shows the list of ingredients. Table 3 shows the extrusion conditions. Table 4 shows the molding conditions. Table 5 shows the recipes and the test results. Of the test procedures, ASTM tests were used for Shore A Hardness, Tensile Strength, and Percentage Elongation at Break.

The "Silky Feel" test was a qualitative test involving several persons reporting whether sample test plaques of 4 inches×5 inches×0.125 inches (10.16×12.7×0.3175 cm) had outer surfaces which when touched by a human hand resembled the feeling one experiences when touching a silk fabric. The four persons were given each of the sample plaques and asked to report whether a plaque resembled the feeling one experiences when touching a silk fabric. The four persons unanimously agreed on the results reported in Table 5.

The delamination test was determined by observing the surface of the molded test plaques of 4×5×0.125 inches (10.16×12.7×0.3175 cm). Delamination can be easily found as bubbles or other surface imperfections on the test plaques near the location on the molded plaque closest to a gate to deliver molten compound to the mold which formed the plaque.

TABLE 2

| Brand Name | Ingredient and Purpose | Commercial Source |
|---|---|---|
| Kraton A1535 | SEBS resin | Kraton |
| Septon 4055 | SEEPS resin | Kuraray |
| Kraton FG1901X | MA-SEBS compatibilizer | Kraton |
| Santoprene RC8001 | TPV resin | ExxonMobil |
| Vicron CaCO$_3$ | filler | Specialty Minerals |
| MB50-002 | Silicon MB surface modifier | Dow Corning |
| Irganox 1010/Irgafos 168 | Antioxidant | Ciba |
| Tinuvin 328/622 | UV Absorber | Ciba |
| Kemamide | Wax | Chemtura |
| Septon TU-Polymer | TPU Compatibilizer | Kuraray |
| Elastollan 880A | TPU resin | BASF |
| Elastollan 1180A | TPU resin | BASF |
| Elastollan S85A | TPU resin | BASF |
| Puretol 380 | Mineral oil plasticizer | Petro Canada |

TABLE 3

Extruder Conditions
All Comparative Examples and Examples

| Extruder Type | 35 L/D 34 mm Twin screw extruder |
|---|---|
| Order of Addition | All ingredients mixed together and fed into the extruder hopper. |
| Zone 1 | 180° C. |
| Zone 2 | 180° C. |
| Zone 3 | 190° C. |
| Zone 4 | 190° C. |
| Zone 5 | 190° C. |
| Zone 6 | 190° C. |
| Zone 7 | 190° C. |
| Zone 8 | 190° C. |
| Zone 9 | 190° C. |
| Die | 200° C. |
| RPM | 400 |
| Form of Product | Pellets |

TABLE 4

Molding Conditions
All Comparative Examples and Examples
Cincinnati molding machine Drying Conditions before Molding:

| | |
|---|---|
| Temperature (° C.) | 60-70 |
| Time (h) | 2-4 |

Temperatures:

| | |
|---|---|
| Nozzle (° C.) | 200 |
| Zone 1 (° C.) | 200 |
| Zone 2 (° C.) | 190 |
| Zone 3 (° C.) | 180 |
| Mold (° C.) | 30 |
| Oil Temp (° C.) | 50 |

Speeds:

| | |
|---|---|
| Screw RPM | 120 |
| Speed (in/s) | 0.5 |

Pressures:

| | |
|---|---|
| Hold Stg 1 (psi) - Time (sec) | 500/2 |

Timers:

| | |
|---|---|
| Injection Hold (sec) | 2 |
| Cooling Time (sec) | 20 |

TABLE 5

| Example (Wt. %) | A | 1 | B | C | 2 | 3 |
|---|---|---|---|---|---|---|
| Kraton A1535 SEBS | 12 | 11.8 | 11.7 | | 5.9 | 5.8 |
| Septon 4055 SEEPS | | | | 6 | | |
| Kraton FG1901X MA-SEBS | 3 | 3 | 2.9 | 3.6 | 3.5 | 3.5 |
| Santoprene RC8001 TPV | 3.9 | 3.9 | 3.8 | 3.9 | 3.8 | 5.8 |
| Vicron CaCO$_3$ Filler | 12 | 11.8 | 11.7 | 11.9 | 11.8 | 11.6 |
| MB50-002 Silicone MB (50% silicone content) | | 1.2 | 2.3 | | 1.2 | 1.2 |
| Irganox Antioxidant | 0.4 | 0.4 | 0.4 | 0.3 | 0.4 | 0.5 |
| Tinuvin UV Absorber | 0.5 | 0.5 | 0.5 | 0.7 | 0.6 | 0.6 |
| Kemamide Wax | 0.6 | 0.5 | 0.5 | 0.7 | 0.5 | 0.5 |
| Septon TU-Polymer | | | | 0.1 | | |
| Elastollan 880A TPU | 49.7 | 49.2 | 48.6 | 31.5 | | |
| Elastollan 1180A TPU | | | | | 31.3 | 30.8 |
| Elastollan S85A TPU | | | | 27.9 | 27.7 | 27.3 |
| Puretol 380 mineral oil | 18 | 17.8 | 17.6 | 13.4 | 13.3 | 12.2 |
| Total | 100 | 100 | 100 | 100 | 100 | 100 |
| Test Results | | | | | | |
| Shore A hardness (ASTM D2240) | 59 | 57 | 57 | 65 | 63 | 65 |
| Tensile Strength (psi, ASTM D412) | 1800 | 1650 | 1571 | 2010 | 1330 | 1860 |
| Elongation (%, ASTM D412) | 690 | 640 | 643 | 710 | 610 | 640 |
| Percent Silicone Present | 0.0% | 0.6% | 1.15% | 0.0% | 0.6% | 0.6% |
| Silky Feel | No | Yes | Yes | No | Yes | Yes |
| Delamination | No | No | Yes | No | No | No |

Reviewing Table 5, all three Comparative Examples and all three Examples had acceptable hardness values, acceptable tensile strength, and acceptable percentage elongation at break to qualify as good thermoplastic elastomer products. Thus, physical properties were unaffected by the presence of the silicone masterbatch surface modifier to impart the silky feel to the plastic surface.

A comparison of Comparative Example A and Example 1 showed the difference because the silicone was present in Example 1: there was a silky feel as tested qualitatively. As little as about 0.6 weight percent of the silicone was enough to impart a silky feel on the surface of the Example 1 sample, as compared with the Comparative Example A sample.

A comparison of Example 1 and Comparative Example B showed how a larger amount of silicone used can cause unacceptable delamination. Thus, the invention requires less than 1.0 weight percent of the silicone surface modifier, desirably less than about 0.8 weight percent, and preferably between about 0.25 weight percent and about 0.75 weight percent.

A comparison of Comparative Example A and Comparative Example C showed that use of a different SBC at a lower concentration along with a larger amount of a blend of two different TPUs and a slightly lower amount of plasticizer oil did not improve the surface of the samples. The comparison between Comparative Example C and Examples 2 and 3 showed that the addition of the silicone provided the silky feel missing from the samples of Comparative Example C. Because the amount of silicone masterbatch was less than about 2.0 weight percent (less than 1.0 weight percent of silicone) in both Examples 2 and 3, there was no perceived delamination. Example 3 differed from Example 2 in that more TPV was used, resulting in a TPE having the required silky feel but also a matte finish.

The invention is not limited to the above embodiments. The claims follow.

What is claimed is:

1. A thermoplastic elastomer compound, comprising
   (a) styrenic block copolymer selected from the group consisting of styrene-ethylene-butylene-styrene and styrene-ethylene-ethylene-propylene-styrene;
   (b) thermoplastic vulcanizate in an amount of about 3 to about 6 weight percent of the thermoplastic elastomer compound, wherein the thermoplastic vulcanizate is a pre-mixed blend of a continuous phase of polyolefin and a discontinuous phase of vulcanized rubber;
   (c) thermoplastic polyurethane;
   (d) compatibilizer to assist in blending of the styrenic block copolymer with the thermoplastic polyurethane; and (e) siloxane polymer in an amount of about 0.1 to about 1.0 weight percent of the thermoplastic elastomer compound.

2. The thermoplastic elastomer compound of claim 1, wherein the siloxane polymer is in a masterbatch having a polyolefin carrier.

3. The thermoplastic elastomer compound of claim 1, wherein the styrenic block copolymer has a weight average molecular weight of between about 70,000 and about 360,000.

4. The thermoplastic elastomer compound of claim 1, wherein the polyolefin is polypropylene and the vulcanized rubber is crosslinked ethylene-propylene-diene rubber.

5. The thermoplastic elastomer compound of claim 1, wherein the compatibilizer is maleic anhydride grafted styrene-ethylene-butylene-styrene.

6. The thermoplastic elastomer compound of claim 1, further comprising plasticizer oil.

7. The thermoplastic elastomer compound of claim 1, further comprising filler.

8. The thermoplastic elastomer compound of claim 7, further comprising an additive selected from the group consisting of adhesion promoters; biocides; anti-fogging agents; anti-static agents; bonding, blowing and foaming agents; dispersants; flame retardants and smoke suppresants; impact modifiers; initiators; lubricants; micas; pigments, colorants and dyes; oils and plasticizers; processing aids; release agents; silanes, titanates and zirconates; slip and anti-blocking agents; stabilizers; stearates; ultraviolet light absorbers; viscosity regulators; waxes; and combinations of them.

9. The thermoplastic elastomer compound of claim 1, wherein ingredients by weight percent of the thermoplastic elastomer compound are

| | |
|---|---|
| Styrenic Block Copolymer Resin | 1-30; |
| Compatibilizer | 0.1-10; |
| Thermoplastic Vulcanizate Resin | 3-6; |
| Thermoplastic Polyurethane Resin | 10-90; |
| Silicone | 0.1-1.0; |
| Optional Plasticizer Oil | 0-40; |
| Optional Filler and | 0-30; |
| Optional Additives | 0-10. |

10. A plastic article formed from the thermoplastic elastomer compound of claim 1.

11. The plastic article of claim 10 in the form of a molded article, an extruded article, or a calendered article.

12. The plastic article of claim 10, in the form of a protective cover for handheld consumer electronics items.

13. The plastic article of claim 10, in the form of an electronic console, controlling device, gaming console, desk computer, or laptop computer.

14. The plastic article of claim 10, wherein the plastic article has an outer surface having a silky feel to a touch of a human hand.

15. A thermoplastic elastomer compound comprising:
(a) styrenic block copolymer selected from the group consisting of styrene-ethylene-butylene-styrene and styrene-ethylene-ethylene-propylene-styrene;
(b) thermoplastic vulcanizate in an amount of about 3 to about 6 weight percent of the thermoplastic elastomer compound;
(c) thermoplastic polyurethane;
(d) compatibilizer to assist in blending of the styrenic block copolymer with the thermoplastic polyurethane; and
(e) siloxane polymer in an amount of about 0.1 to about 1.0 weight percent of the thermoplastic elastomer compound;
wherein the thermoplastic elastomer compound has a silky feel to a touch of a human hand.

16. A plastic article formed from a thermoplastic elastomer compound, the thermoplastic elastomer compound comprising:
(a) styrenic block copolymer selected from the group consisting of styrene-ethylene-butylene-styrene and styrene-ethylene-ethylene-propylene-styrene;
(b) thermoplastic vulcanizate in an amount of about 3 to about 6 weight percent of the thermoplastic elastomer compound;
(c) thermoplastic polyurethane;
(d) compatibilizer to assist in blending of the styrenic block copolymer with the thermoplastic polyurethane; and
(e) siloxane polymer in an amount of about 0.1 to about 1.0 weight percent of the thermoplastic elastomer compound;
wherein the plastic article has an outer surface having a silky feel to a touch of a human hand.

* * * * *